United States Patent

Kato

Patent Number: 5,182,145
Date of Patent: Jan. 26, 1993

[54] BRIGHT TAPE FOR MOLDING

[75] Inventor: Katsuhisa Kato, Moriya, Japan

[73] Assignees: Tokiway Chemical Industries, Co., Ltd., Chiba; System Technical Industries Co., Ltd., Ibaragi, both of Japan

[21] Appl. No.: 500,783

[22] Filed: Mar. 28, 1990

[30] Foreign Application Priority Data

| Jun. 30, 1989 [JP] | Japan | 1-77286[U] |
| Oct. 6, 1989 [JP] | Japan | 1-117831[U] |
| Oct. 20, 1989 [JP] | Japan | 1-122826[U] |

[51] Int. Cl.⁵ ............................. B60R 13/00
[52] U.S. Cl. .................. 428/31; 428/458; 428/461
[58] Field of Search ............ 428/31, 458, 461

[56] References Cited

U.S. PATENT DOCUMENTS

| 4,305,981 | 12/1981 | Muroi et al. | 428/31 |
| 4,351,864 | 9/1982 | Giannakidis | 428/31 |
| 4,599,275 | 7/1986 | Hayashi et al. | 428/461 |

*Primary Examiner*—Paul J. Thibodeau
*Assistant Examiner*—Mark Formon
*Attorney, Agent, or Firm*—Wenderoth, Lind & Ponack

[57] ABSTRACT

A bright tape is attached to the outer surface of a molding fitted in a connecting portion between a window glass of a vehicle such as automobile and the like and a body panel, in which a metalized film is attached to the entire surface of a synthetic resin film. An ionomer resin layer is polymerized on the metalized film and a vinyl chloride sheet is laminated by an adhesive agent on the outer surface of the metalized film from where the synthetic resin film has been peeled off, thereby providing an excellent brightness and preventing cracks and wrinkles. Particularly, wrinkles and cracks generated when the corner portions are bent can be prevented from occurring.

4 Claims, 3 Drawing Sheets

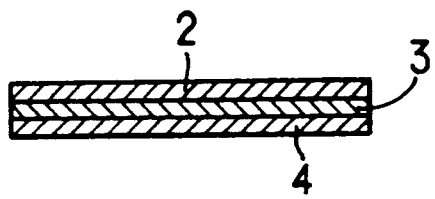
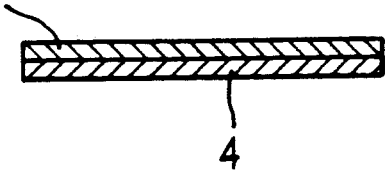
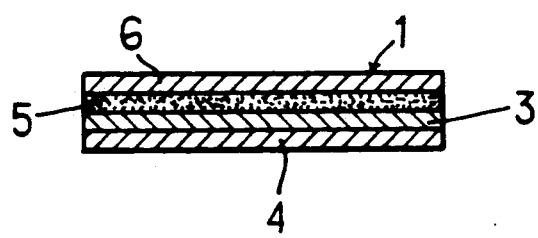
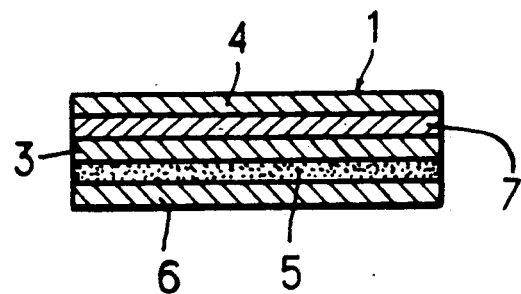
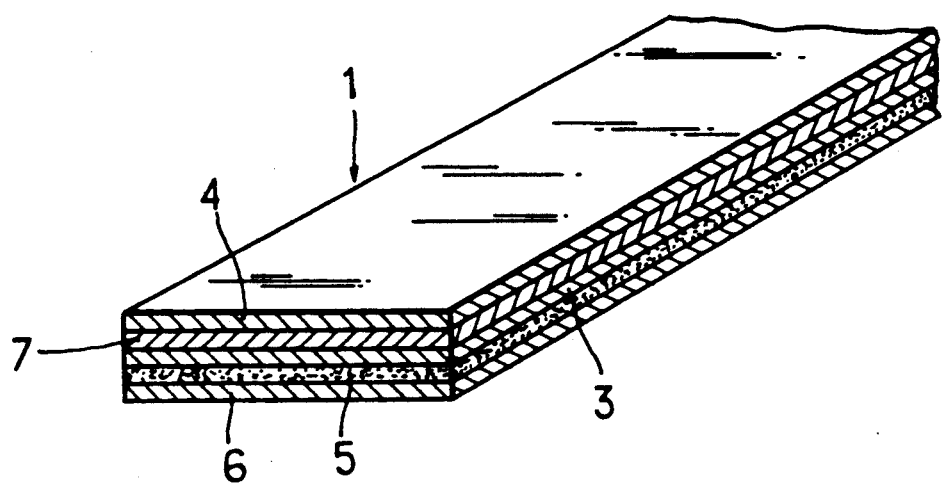

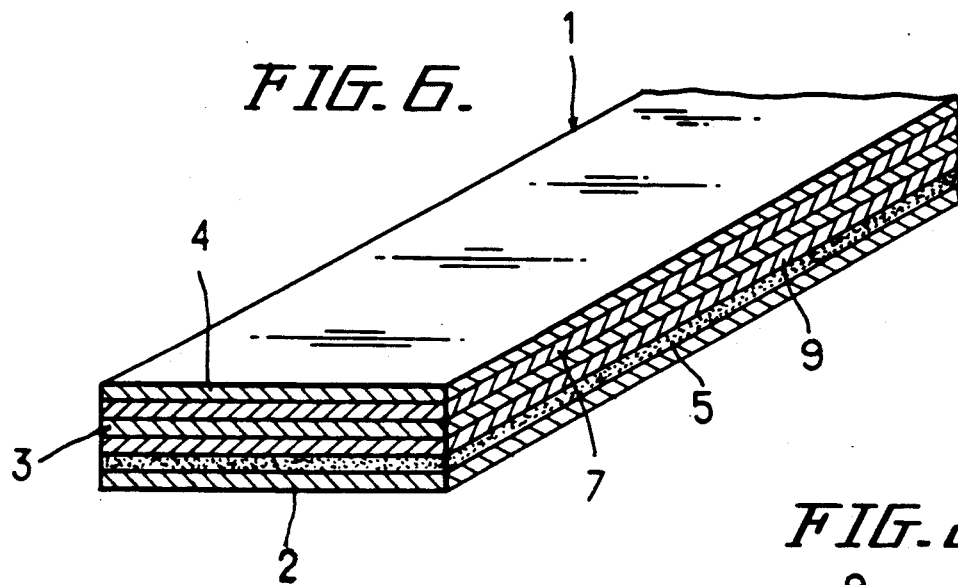
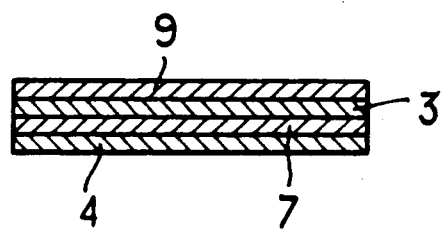
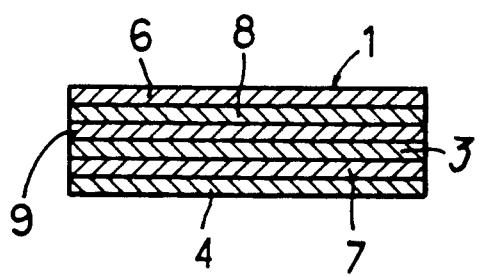
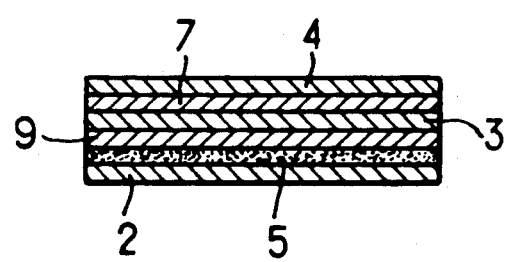
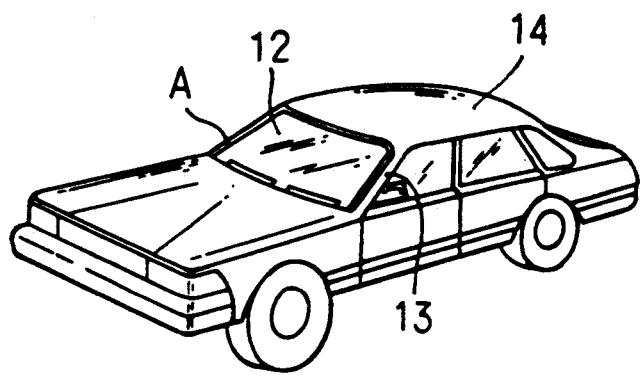

BRIGHT TAPE FOR MOLDING

BACKGROUND OF THE INVENTION

1. Field of the Invention

This invention relates to a bright tape which is attached to the outer surface of a molding fitted in a connecting portion between a window glass of various kinds of vehicles and a body panel thereof.

2. Brief Description of the Prior Art

In general, a bright tape used in this kind of molding is composed of a polyester and a metalized layer formed of various kinds of metals attached to the front surface or rear surface of said polyester or comprises a tape of metal foil itself instead of the polyester.

Although a bright tape on which a metalized layer attached thereon is strong in heat resistance, it has such shortcoming as that the polyester easily gets wrinkled when it is bent by heating at its corner, etc. and a lot of wrinkles are generated when a wide bright tape is required, whereby its brightness and ornamental value is greatly reduced.

Also, a bright tape using a metal foil instead of the polyester has such shortcoming as that as the metal foil itself is formed very thin, if it is laminated in various kinds of resin layer, a lot of wrinkles and spots are easily generated, and large or small-sized wrinkles are generated particularly at the bent portions such as corners, thereby to badly spoil the bright surface.

SUMMARY OF THE INVENTION

It is therefore an object of the present invention to provide a bright tape which is capable of eliminating all the shortcoming inherent in the conventional bright tape for the molding and which is excellent in brightness and has a high ornamental value.

In order to achieve the above object, the present invention is designed such that a synthetic resin film such as polyester having an excellent lubrication is provided with a metalized film formed of various kinds of metal attached to the front surface or rear surface of the synthetic resin film, and an ionomer resin layer is polymerized to the metalized film. And the synthetic resin film of the polyester, etc. is peeled off and the metalized film is transferred to the ionomer resin layer side and a vinyl chloride sheet having the same property as that of the component material of the molding is polymerized and laminated by an adhesive agent on the metalized film.

BRIEF DESCRIPTION OF THE DRAWINGS

FIGS. 3(a) through 3(c) shows a sectional view showing the manufacturing process of the bright tape according to the present invention;

FIG. 4 is a perspective view of a second embodiment of the bright tape;

FIG. 5 is likewise a sectional view of the second embodiment;

FIG. 6 is a perspective view showing a third embodiment of the bright tape;

FIG. 7 is a partly sectional view showing a portion of a manufacturing process of the bright tape in the third embodiment;

FIG. 8 is a sectional view showing a synthetic resin film peeled off from the state of FIG. 7 of a state wherein the synthetic resin film is peeled off from a state shown in FIG. 7;

FIG. 9 is a sectional view showing a state wherein a vinyl chloride sheet polymerized to a metalized layer side; and FIG. 10 is a perspective view showing the whole picture of an automotive vehicle in which the bright tape of the present invention is attached to its body.

DETAILED DESCRIPTION OF THE PREFERRED EMBODIMENTS

Figure 1:
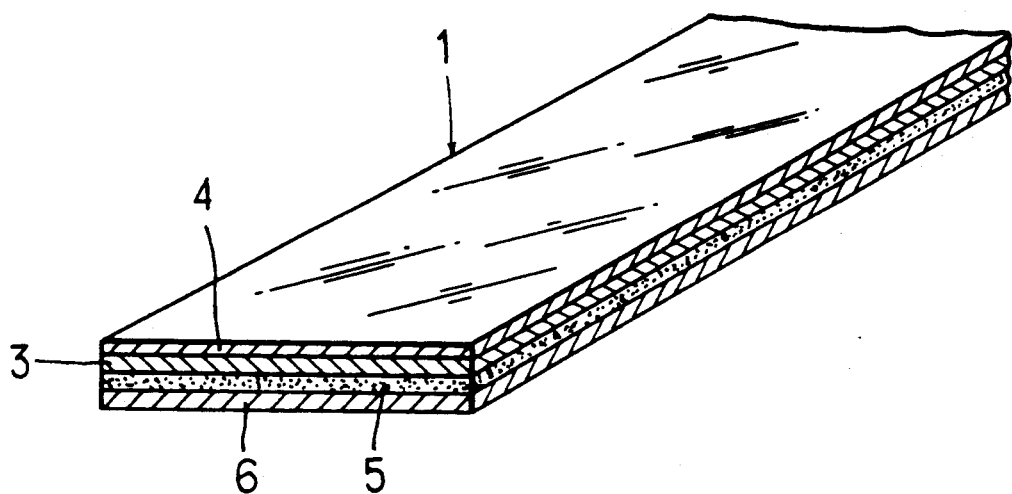
FIG. 1 is a perspective view showing a first embodiment of a bright tape according to the present invention.

In FIG. 1, the numeral 1 denotes a bright tape which is embedded in an upper portion of a molding A which is attached between a body panel 13 and a window glass 12 of an automotive vehicle 14 as shown in FIG. 10.

This bright tape 1, as shown in FIG. 3(a), comprises an elongated polyester film 2 and a metalized film 3 formed of various kinds of metal such as aluminum attached to an upper surface or lower surface of said polyester film 2. The attached metalized film 3 is applied with an ionomer resin layer 4 which is polymerized on the metalized film 3, said ionomer resin layer 4 has better adhering property to the metalized film 3 than the polyester film 2. In the foregoing state, when the polyester film 2 is isolated from the metalized film 3 (FIG. 3(b)), the metalized film 3 is beautifully adhered to the ionomer resin layer 4. Then, various kinds of adhesive agents 5 are applied to the isolated surface of the metalized film 3 to bond a vinyl chloride sheet 6 having the same property as that of the molding made of a vinyl chloride, thereby the bright tape 1 according to the present invention as shown in FIG. 3(c) can be obtained.

Figure 2:
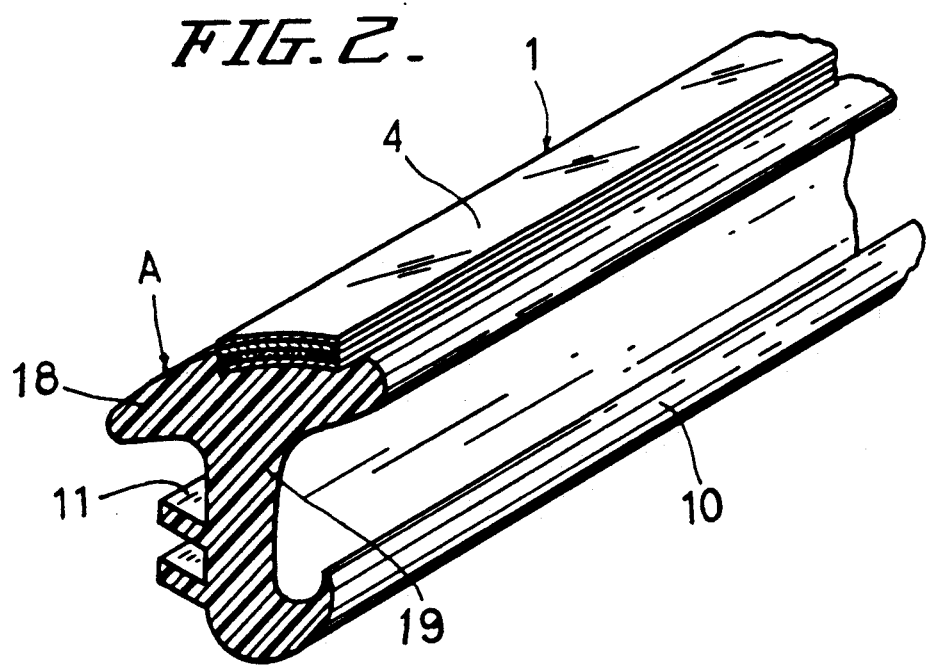
FIG. 2 is a perspective view of the bright tape embedding in a molding.

The molding A for windscreen glass of vehicle is composed of the vinyl chloride and comprises a molding head portion 18 with the bright tape 1 embedded on the top portion thereof, an inserting leg 19 which is to be inserted in a gap of a body panel 13, a bending support piece 10 disposed at a lower end of the inserting leg 19, and an auxiliary support piece 11 disposed to a side surface in the longitudinal direction of the inserting leg 19, all being integrally formed (FIG. 2).

Next, in the second embodiment shown in FIGS. 4 and 5, the bright tape 1 comprises a vinyl chloride sheet 6 situated in the lowest portion and having the same property as that of the molding A in order to enhance and ease attachment, and the metalized film layer 3 attached by the adhesive agent 5 to an upper portion of the vinyl chloride sheet 6. Particularly, an ethylene copolymer resin layer 7 is attached on the top of the metalized film layer 3. This ethylene copolymer resin has such a function as to be most firmly attached to the metalized film layer 3.

Furthermore, on the top of the ethylene copolymer resin layer 7, the ionomer resin layer 4 having an excellent weather resistance property and transparency and serving as its outer surface is formed.

In the embodiment of FIGS. 6 through 9, a mold releasing resin 8 having an excellent lubricant property and peeling function is attached to the synthetic resin film such as polyester, etc. having an excellent lubricant. A protecting film 9 of a synthetic resin is attached to an outer surface of the mold releasing resin layer 8.

The protecting film 9 is adapted to allow the metalized film layer 3 formed of a metal such as aluminum, chrome, nickel, etc. evenly applied to the outer surface thereof. Furthermore, on the outer surface of the metalized film layer 3, an ethylene copolymer resin layer 7 having an excellent adhesive property is melted and laminated. And a transparent ionomer resin layer 4 is polymerized on the outer surface of the ethylene copolymer resin layer 7.

A bright tape shown in FIG. 8 comprises the metalized layer 3 and a protecting film 9 permitted to remain on the upper surface of the metalized layer 3 in order to enhance an easy peeling by the mold releasing resin layer 8. The metalized layer 3 of a lower portion of the protecting film 9 which has been peeled off and served as the outer surface is ready to be transferred onto the ethylene copolymer resin layer 7.

Also, in FIG. 9, the vinyl chloride sheet 6 is formed on the outer surface of the protecting film 9 shown in FIG. 8 through the adhesive agent 5. The vinyl chloride sheet 6 is integrally molded with the molding A having the same property as that of the vinyl chloride. It is a general practice that the polymerization of the ionomer resin layer 4 is performed when the molding A is molded. An ethylene copolymer tape is sometimes used as a component element of the ethylene copolymer resin layer 7.

According to a bright tape for a molding of the present invention, because the tape is obtained by being transferred from a synthetic resin film such as polyester having an excellent lubricant, the outer surface of the metalized layer can be formed thin and firmly attached like a mirror surface. Further, it has an excellent brightness, and cracking, wrinkles, etc., which are generated during molding, can be prevented. Stretching of the tape taken place during molding can also be prevented. Moreover, even at the corner portion by a wide bright tape, generation of such wrinkles, etc. can be prevented.

According to a bright tape of the second embodiment shown in FIG. 4, the vinyl chloride sheet provided to the lowest portion of the bright tape comes to have the same property as that of the molding and is melted together and integrally formed and firmly connected. Moreover, the metalized layer fully reinforces the lack of adhesive force with respect to the ionomer resin layer which is excellent in weather resistance property of its outer surface and high in transparency. As a result, gaps and wrinkles are not generated for a long period of time. In addition, as an ethylene copolymer resin layer having the most excellent adhesive property is interposed between the metalized layer and the ionomer resin layer having the weak adhesive property, they can be firmly integrally formed.

Furthermore, in the embodiment shown in FIGS. 6 through 9, a metalized film layer such as aluminum, etc. is attached to the outer surface with the synthetic resin protecting film coated thereon. Accordingly, the thin metalized film can be stably protected. Furthermore, as there is a mold releasing resin layer between the synthetic resin film and the protecting film, the peeling of the synthetic resin film is enhanced.

What is claimed is:

1. A bright tape for molding to be interposed between a glass panel and a body panel of a vehicle comprising:
   a metalized film,
   an ethylene copolymer resin layer melt laminated on one surface of the metalized film,
   an ionomer resin layer polymerized on the outer surface of said ethylene copolymer resin layer, and
   a vinyl chloride sheet attached by an adhesive agent to the other surface of the metalized film.

2. A bright tape for a molding to be interposed between a glass panel and a body panel of a vehicle comprising:
   a metalized film attached to an elongated polyester film,
   an ethylene copolymer resin layer melt laminated on the outer surface of the metalized film, and
   an ionomer resin layer polymerized on the outer surface of said ethylene copolymer resin layer.

3. A bright tape for molding as claimed in claim 2, wherein a protecting film is interposed between the metalized film and the polyester film.

4. A bright tape for molding as claimed in claim 3, wherein a mold releasing resin layer is interposed between the polyester film and the protecting film.

* * * * *